3,487,065
AMINOACYLAMIDOANDROSTENES
George Rogelio Flouret, Waukegan, and John Wayne Cole, Deerfield, Ill., assignors to Abbott Laboratories, North Chicago, Ill., a corporation of Illinois
No Drawing. Filed Jan. 2, 1968, Ser. No. 694,792
Int. Cl. A61k 27/00; C07c 169/24
U.S. Cl. 260—112.5          10 Claims

ABSTRACT OF THE DISCLOSURE

3β - hydroxy - 17 - aminoacylamido - 5 - androstenes are prepared from 17α - aminoandrost - 5 - en - 3β - ol by coupling it with a carbobenzoxyaminoacid active ester and subsequently cleaving the cabobenzoxy group. The new compounds have significant anti-dpressant acitivity.

---

The present invention is concerned with 17α-aminoacylamidoandrost - 5 - en - 3β - ols and their preparation. The new compounds have the formula:

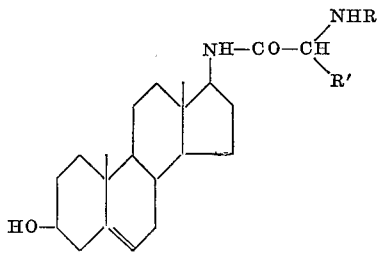

wherein R is hydrogen or aminoacyl of the formula wherein R″ is hydrogen, loweralkyl or hydroxyloweralkyl and R′ is hydrogen, loweralkyl, hydroxyloweralkyl or hydroxyphenylloweralkyl with the further provision that when R′ is hydrogen, R is an aminoacyl as defined, and pharmaceutically-acceptable acid addition salts thereof. The N-substituents carried by the new 17-aminosteroids generally are the acyl moieties of simple amino acids. The pharmaceutically-acceptable acid addition salts referred to above are the salts formed with hydrochloric acid, sulfuric acid, phosphoric acid, the p-toluenesulfonates, methanesulfonates, citrates, tartrates, acetates and the like. The invention is also directed to the valuable intermediates from which the above compounds are made. These intermediates have the same structural formula shown above but with R being benzoxycarbonyl.

The new intermediates are prepared by reacting 17α- or 17β-aminoandrost-5-en-3β-ols with compounds of the formula:

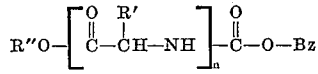

wherein R′ has the above-indicated meaning, R″ is p-nitrophneyl or 2,4-dinitrophenyl, Bz stands for benzyl, and n is an integer from 1 to 4 inclusive. These "blocked" intermediates carry in the 17-position a substituent of the formula —NH[COCHR′NH]$_n$COOBz which allows easy cleavage of the carbobenzoxy substituent with sodium in ammonia. The resulting primary amino group can be modified by acylating it with amino acids according to known methods to form longer peptide chains, e.g. by repeating the above procedure using blocked intermediates such as the 4-nitrophenyl N-carbobenzoxy-glycinate.

In a simple embodiment of the process of this invention, 2,4-dinitrophenyl N-carbobenzoxy - L - serinate is reacted with 17α- or 17β-aminoandrost-5-en-3-ol in chloroform at room temperature for several hours. 2,4-dinitrophenol forms as a by-product. The formed N-substituted aminoandrostene is then reduced with sodium in liquid ammonia whereby the carbobenzoxy group cleaves to form toluene and carbon dioxide, leaving 17α- or 17β-L-serinamidoandrost-5-en-3β-ol.

The new compounds are effective anti-depressants when given to warm-blooded animals in dosages between 5 and 50 mg./kg.; they can be administered intraperitoneally, orally, subcutaneously or by other routes; obviously the oral route is the preferred method of administration. The activity observed is comparable to the anti-depressant activity shown by the oral administration of 25 mg./kg. of amitryptylene (U.S. Dispensatory, 26th Edition, page 62). For instance, 17β - L - seryl - L - serinamidoantrost-5-en-3β-ol shows good anti-depressant activity when administered orally to warm-blooded animals at small dosages; the resulting effect has strong similarity with the effect obtained by the administration of 25 mg./kg. of amitryptylene to test animals. Similar activity is also observed when the above compound is administered intraperitoneally. The new compounds show these valuable biological activities, while the closely related blocked intermediates from which they are prepared and the analogous steroids carrying at the 17-position a hydroxyacylamido substituent are inactive.

In order to illustrate the preparation of the compounds of the present invention, reference is made to the following examples which are not intended to limit this invention in any respect. In all these examples, the solvent ratios indicated for crystallizations and extractions may be changed and varied without changing the nature of the products described. In general, the total amount of solvents used is 4 to 40 times the amount of the product being treated. Alcohol/chloroform mixtures are usually used in a ratio of about 1:10. In all instances, the activity reported of the compounds is that observed using standard anti-depressant test methods, observing groups of four mice in each test. The results are expressed as points of a scale extending from 0 to 3, the latter indicating highest activity. Amythyptylene shows an activity of +2 after 25 mg./kg. oral administration.

EXAMPLE 1

17β-L-tyrosinamidoandrost-5-en-3β-ol

To a solution of 435 mg. of 17β-aminoandrost-5-en-3β-ol in 8 ml. of chloroform is added 800 mg. of p-nitrophenyl N-carbobenzoxy-O-benzyl - L - tyrosinate. After a few minutes, a clear solution results which becomes milky after about 15 minutes. The mixture is allowed to stand for 16 hours at room temperature and is then evaporated to dryness under reduced pressure. The solid residue is treated with ether and filtered. The resulting white solid is recrystallized from chloroform/hexane, producing 0.91 g. of white rosettes of 17β-(N-carbobenzoxy-O-benzyl-L-tyrosinamido)androst - 5 - en - 3β - ol melting at 202–4° C.; [α]$_D^{26}$=—26.7° (1% in chloroform).

A solution of 366 mg. of the compound just described in 30 ml. of dioxane is added to 400 ml. of freshly-distilled liquid ammonia. Sodium is stirred into the mixture at the boiling point of the ammonia by touching it with a glass tube containing sodium until a blue color develops and lasts for about 30 seconds. Solvent and ammonia are then evaporated in vacuo. The white residue is treated with chloroform/methanol/water and the aqueous phase is separated from the organic phase. The aqueous phase is washed three times with chloroform/methanol and the organic layer is combined with the previous organic phase, washed with brine, dried with sodium sulfate, and evaporated to dryness. Crystallization of the residue from ethanol/chloroform/hexane yields 200 mg.

of 17β-L-tyrosinamidoandrost-5-en-3β-ol, melting at 258–60° C.; $[\alpha]_D^{26} = -37°$ (0.95% in ethanol). The activity of the compound is observed as +1.5 after oral administration of 50 mg./kg.

EXAMPLE 2

17β-L-leucinamidoandrost-5-en-3β-ol

In a repetition of the procedure of Example 1 but using 639 mg. of p-nitrophenyl carbobenzoxy-L-leucinate in place of p-nitrophenyl N-carbobenzoxy-O-benzyl-L-tyrosinate, crystalline 17β - (N - carbobenzoxy-L-leucinamido) androst-5-en-3β-ol is obtained in a yield of 88% of theory; it melts at 165–7° C. after crystallization from acetone/heptane; $[\alpha]_D^{26} = -77.6°$ (1% in chloroform). This compound is treated as in the previous example with liquid ammonia and sodium to yield 375 mg. of crude 17β-L-leucinamidoandrost - 5 - en - 3β-ol. After recrystallization from ethanol/hexane, 250 mg. (58% of theory) of the pure compound is obtained, melting at 194–0° C.; $[\alpha]_D^{25} = -39°$ (1% in ethanol). With oral administration of 50 mg./kg., an activity of +2 is observed; 20 mg./kg. given orally shows activity +1 and 20 mg./kg. given intraperitoneally shows activity +2.

EXAMPLE 3

17β-L-serinamidoandrost-5-en-3β-ol

Following the procedure shown in Example 1 but using 2,4-dinitrophenyl carbobenzoxy-L-serinate as the reactant and tetrahydrofuran as the reaction medium, 17β-(N-carbobenzoxy-L-serinamido)androst-5-en-3β-ol melting at 133–6° C. (from dioxane/hexane) is obtained which appears to be polymorphic with melting ranges at 125–7° and 110–13° C.; $[\alpha]_D^{24} = -59.6°$ (1% in dimethylformamide). The previously outlined cleavage with sodium in liquid ammonia, and treatment of the residue with n-butanol/chloroform/hexane, phase separation and recrystallization of the solids obtained from the organic phase, yields 17β-L-serinamidoandrost-5-en-3β-ol (from methyl acetate), melting at 204–6° C.; $[\alpha]_D^{25} = -116.6°$ (1% in dimethylformamide). Oral administration of 10–20 mg./kg. shows activity +2. Intraperitoneal administration of 5 mg./kg. produces activity +1.

The p-toluenesulfonate salt of the above compound is made by adding an ether solution of p-toluenesulfonic acid to a chloroform/methanol solution of an equivalent amount of 17β - L - serinamidoandrost - 5 - en-3β-ol, and evaporating the mixture. From ethanol solution, the salt separates as white crystals, melting at 236–237°.

EXAMPLE 4

17β-glycylglycinamidoandrost-5-en-3β-ol

Repeating the procedure of Example 2 but using p-nitrophenyl N-carbobenzoxyglycylglycinate as the coreactant for the aminosteroid and dioxane as the medium yields 17β-(N-carbobenzoxyglycyglycinamido)androst-5-en-3β-ol, melting at 228–9° C. (from dioxane);

$$[\alpha]_D^{26} = -55.4°$$

(1% in dimethylformamide). This intermediate, upon treatment with sodium and liquid ammonia, produces 17β-glycylglycinamidoandrost-5-en-3β-ol, melting at 289–91° C. (from ethanol/hexane); $[\alpha]_D^{26} = -78.6°$ (1% in dimethylformamide). Oral administration of this compound at a dose of 50 mg./kg. shows activity +3.

When an ethanol solution of this product is titrated with one molar equivalent of 0.1 N hydrochloric acid and the resulting solution is evaporated at room temperature, the salt, 17β-(glycylglycinamido)androst-5-en - 3β - ol hydrochloride is obtained.

EXAMPLE 5

17α-L-serinamidoandrost-5-en-3β-ol

To a solution of 578 mg. of 17α-aminoandrost-5-en-3β-ol in 6 ml. of dioxane is added a solution of 826 mg. of 2,4-dinitrophenyl N-carbobenzoxy-L-serinate in 2.3 ml. of dioxane. After 8 hours at room temperature, ether/hexane (1:1) are added until the solution becomes cloudy. After 2 hours, the solids are separated and washed with ether to yield, after recrystallization from chloroform/methanol/hexane, 792 mg. of 17α-(N-carbobenzoxy-L-serinamido)androst-5-en-3β-ol, melting at 178–80° C.; $[\alpha]_D^{24} = -11.1°$ (1% in ethanol).

A solution of 600 mg. of this compound in 30 ml. of dioxane is added to 400 ml. of liquid ammonia and reduced with sodium as described in Example 1. The solution is then evaporated in vacuo, and the solid residue is dissolved in chloroform/methanol/water. The organic phase is separated, and the aqueous phase is washed three times with chloroform/ethanol. The combined organic extracts are washed with brine, dried, filtered and evaporated to dryness. Recrystallization of the white solid from tetrahydrofuran/ethanol/hexane produces 200 mg. of white clusters of needles of 17α-L-serinamidoandrost-5-en-3β-ol, melting at 199–202° C.; $[\alpha]_D^{26} = -17.6°$ (1% in ethanol). Oral activity of this compound at doses of 20 or 50 mg./kg. shows activity +1 in each instance.

EXAMPLE 6

17β-D-serinamidoandrost-5-en-3β-ol

Following the procedure of Example 3 but using 2,4-dinitrophenyl N-carbobenzoxy-D-serinate as the coreactant for 17β-aminoandrost-5-en-3β-ol and dioxane as the solvent, 17β-(N-carbobenzoxy-D-serinamido)androst-5-en-3β-ol is obtained, melting at 168–70° C. (from methanol/chloroform/hexane); $[\alpha]_D^{25} = -49°$ (1% in ethanol). Further treatment of this intermediate as described in Example 5 produces white clusters of needles of 17β-D-serinamidoandrost-5-en-3β-ol, melting at 247–50° C. (from tetrahydrofuran/ethanol/ether/hexane); $[\alpha]_D^{26} = -120°$ (1% in acetic acid). Oral administration at a dose of 50 mg./kg. shows activity +2; with 20 mg./kg., the activity is +1.

EXAMPLE 7

17β-(L-seryl-L-serinamido)androst-5-en-3β-ol

To a solution of 207 mg. of 2,4-dinitrophenyl N-carbobenzoxy-L-serinate in 0.5 ml. of dioxane is added 188 mg. of 17β-L-serinamidoandrost-5-en-3β-ol. After 16 hours at room temperature, the mixture is diluted with ether and cooled to cause separation of a white solid residue. This residue is separated by filtration, washed with ether and recrystallized from tetrahydrofuran/ethanol, giving 195 mg. of 17β - (N - carbobenzoxy - L - seryl-L-serinamido) androst-5-en-3β-ol, melting at 207–209° C.

The intermediate just described is dissolved in 400 mg. of liquid ammonia and treated with sodium as described in Example 1. After evaporation of the ammonia, the white residue is dissolved in ethanol/chloroform/water. The aqueous layer is separated, extracted four times with ethanol/chloroform and the extract is combined with the organic phase from which the aqueous layer was separated. The combined organic solutions are washed with brine, dried over sodium sulfate and evaporated to leave a white solid which is recrystallized from tetrahydrofuran/ethanol producing 43 mg. of 17β-(L-Seryl-L-serinamido)androst - 5 - en - 3β - ol, melting at 212–15° C. with decomposition.

Using the procedures analogous to those described above, other steroid 17α- and 17β-amines can be coupled with the blocked aminoacyl esters to form analogs and homologs of the products described above. Steroid amines which can be used as starting materials for such couplings include the 17α- and 17β-amino derivatives of 5α-androstan-3β-ol, 5α-androstan-3-one, androst-4-en-3-one, 5α - androstan - 11β - ol, 16α - methylandrost - 5-en - 3β - ol, 3α- or 3β - alkoxyestra - 1,3,5 - triene, and the 17α- or 17β-monoalkylamino derivatives of androst-5-en-3β-ol and androst-4-en-3-one. Modifications of the products by known techniques such as salt formation, ester formation and mild reduction to obtain the saturated analogs of the Δ⁵-compounds described above will be apparent to those skilled in the art. For instance, the compound described in Example 4 can be hydrogenated in alcoholic solution in the presence of a platinum catalyst at 5–50 p.s.i.g. hydrogen pressure and at the temperature between 20–50° C. to produce 17β-glycylglycinamidoandrostan-3β-ol.

As outlined above, the compounds of the present invention are made by way of blocked intermediates. In making these intermediates, 17α- or 17β-aminoandrostanes or their analogs are reacted with compounds of the formula

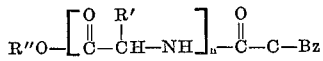

in an inert organic solvent at a temperature of between −10° and +30° C. for a period of at least 15 minutes. This reaction produces almost quantitative yields of the blocked intermediate. Among the inert solvents most useful for this reaction are dioxane, chloroform, tetrahydrofuran, dimethylformamide or other organic solvents in which either the amino steroid used as the starting material or the product obtained is soluble to the extent of at least 2% at room temperature.

The produced intermediate is subsequently cleaved with sodium in liquid ammonia. In practice, the blocked intermediate is dissolved in liquid ammonia and sodium is introduced in minute increments until the ammonia solution turns blue and the blue color remains for a period of at least 30 seconds.

We claim:
1. The process of making 17-aminoacylamido steroids comprising the steps of treating a 17-aminosteroid in an inert organic solvent with a compound of the formula

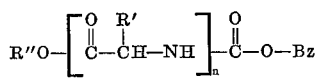

wherein R′ is hydrogen, loweralkyl, hydroxyloweralkyl or hydroxyphenylloweralkyl, R″ is p-nitrophenyl or 2,4-dinitrophenyl, Bz is benzyl, and n is an integer from 1 to 4 inclusive, at a temperature of between −10° C. and +30° C. for a period of at least 15 minutes, isolating the formed 17 - (N - carbobenzoxy - acylamido) - steroid, and cleaving the carbobenzoxy group therefrom by reacting said 17 - (N - carbobenzoxyacylamido)steroid in liquid ammonia with sodium until a blue discoloration develops in the solution and remains for a period of at least 30 seconds.

2. A compound of the formula

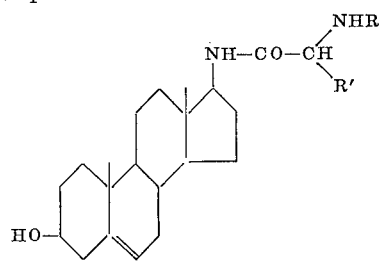

wherein R is hydrogen, benzoxycarbonyl or aminoacyl of the formula

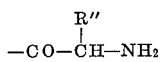

wherein R″ is hydrogen, loweralkyl or hydroxyloweralkyl, R′ is hydrogen, loweralkyl, hydroxyloweralkyl, or hydroxyphenylloweralkyl with the further provision that when R′ is hydrogen, R is the above defined aminoacyl, and pharmaceutically-acceptable acid addition salts thereof.

3. The compound of claim 2 wherein R′ is p-hydroxybenzyl and R is hydrogen.

4. The compound of claim 2 wherein R′ is isobutyl and R is hydrogen.

5. The compound of claim 2 wherein R′ is hydroxymethyl and R is hydrogen.

6. The compound of claim 2 wherein R is

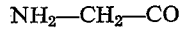

and R′ is hydrogen.

7. The compound of claim 2 wherein R is

and R″ is hydroxymethyl.

8. The compound of claim 2 wherein R is benzoxycarbonyl and R′ is loweralkyl, hydroxyloweralkyl or hydroxyphenylloweralkyl.

9. The compound of claim 8 wherein R′ is hydroxymethyl.

10. The compound of claim 8 wherein R′ is isobutyl.

References Cited

UNITED STATES PATENTS 3,001,988    9/1961    Nysted.

HENRY A. FRENCH, Primary Examiner

U.S. Cl. X.R.

260—397.3, 397.5, 999

PO-1050
(5/69)

UNITED STATES PATENT OFFICE
CERTIFICATE OF CORRECTION

Patent No. 3,487,065              Dated Dec. 30, 1969

Inventor(s) George Rogelio Flouret, John Wayne Cole

It is certified that error appears in the above-identified patent and that said Letters Patent are hereby corrected as shown below:

In Column 1, line 2 after 17 delete "o" and insert -- $\overset{\text{O}}{\underset{\|}{}}$ --; In Column 1, line 5 delete "dpressant" and insert --depressant--
In Column 1, line 6 after 17 delete "o" and insert -- $\overset{\text{O}}{\underset{\|}{}}$ --; In Column 1, line 9 after formula please insert --

$$-CO-\overset{R''}{\underset{|}{C}}H-NH_2$$

In Column 3, line 19 after 194- delete "0" and insert --6--;

In Column 5, line 15 in the formula it should read $$-\overset{O}{\underset{\|}{C}}-\underline{O}-Bz \quad \text{instead of} \quad \overset{O}{\underset{\|}{C}}-\underline{C}-Bz$$

SIGNED AND
SEALED
MAY 12 1970

(SEAL)
Attest:

Edward M. Fletcher, Jr.
Attesting Officer

WILLIAM E. SCHUYLER, JR.
Commissioner of Patents